Feb. 2, 1960 — L. F. FALKENSTEIN — 2,923,762
CABLE JOINT CONSTRUCTION
Filed Dec. 27, 1955 — 2 Sheets-Sheet 2
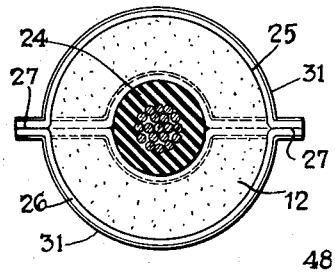
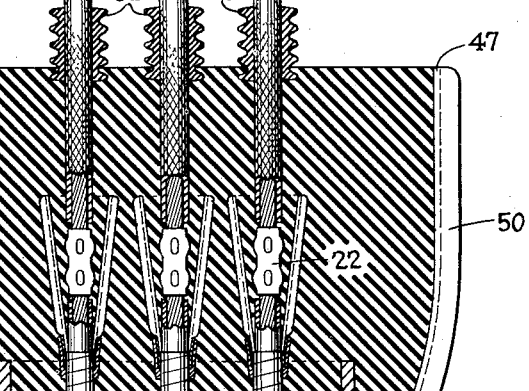
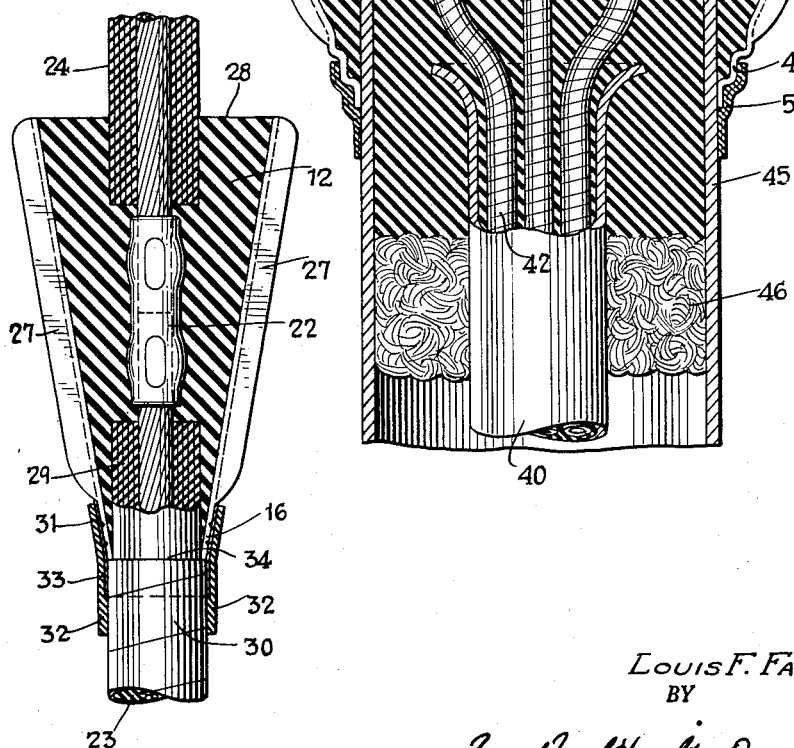
INVENTOR.
LOUIS F. FALKENSTEIN.
BY
ATTORNEYS.

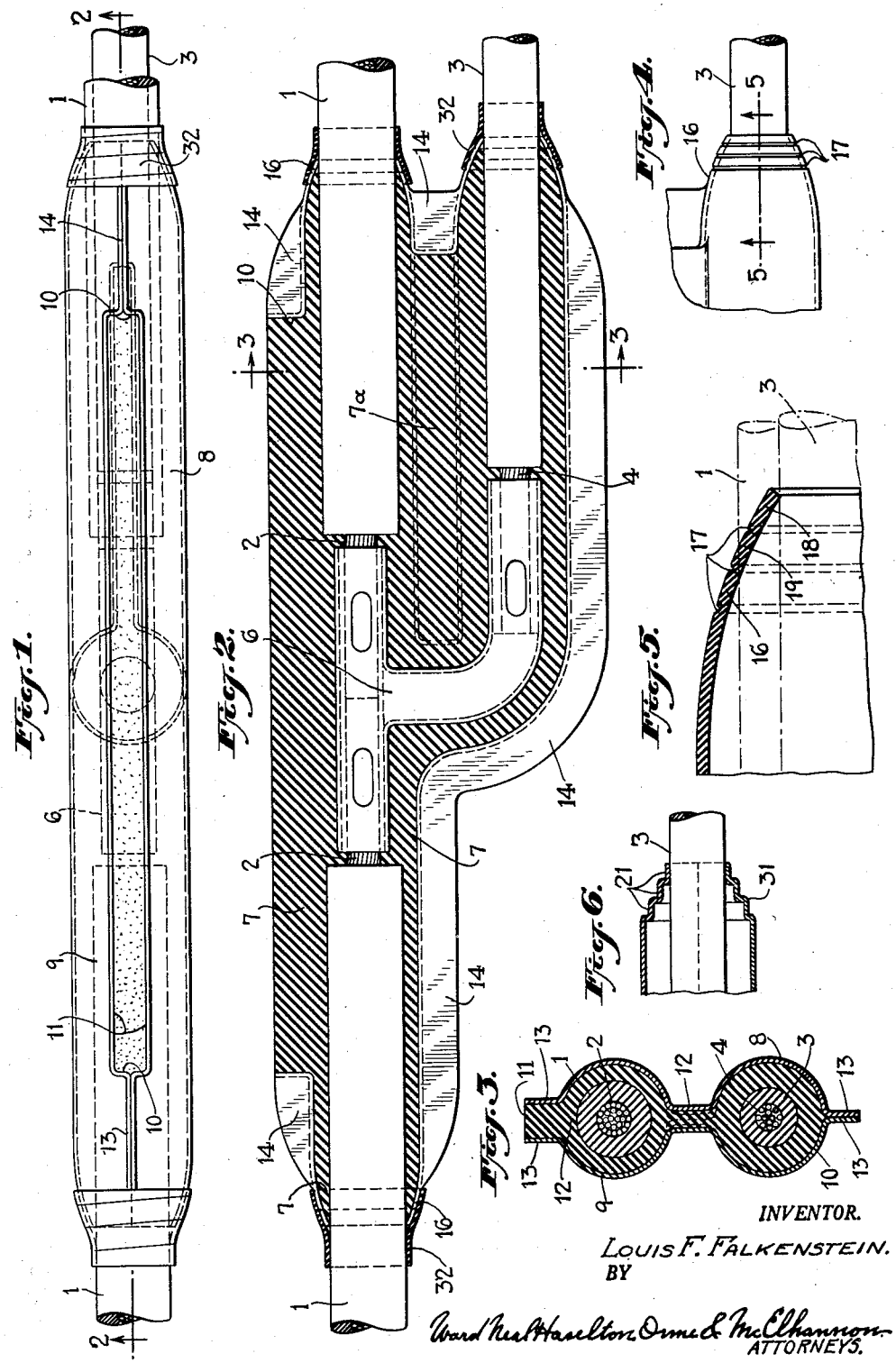

United States Patent Office 2,923,762
Patented Feb. 2, 1960

2,923,762

CABLE JOINT CONSTRUCTION

Louis F. Falkenstein, Franklin Square, N.Y., assignor to Consolidated Edison Company of New York, Inc., New York, N.Y., a corporation of New York Application December 27, 1955, Serial No. 555,515

3 Claims. (Cl. 174—92)

This invention relates to improvements in electrical cable joint insulation. More particularly it relates to means and methods for insulating and protecting a cable joint.

The art of insulating cable joints is quite highly developed. In spite of this fact, however, lead sheathed electric cable joints are today in many cases being insulated by methods adopted long ago, namely, by placing a lead sleeve about the joint and then forming a wiped lead joint between the sleeve and lead sheath. This technique requires a great deal of time and skilled labor. Accordingly, apparatus which would eliminate the necessity of a wiped joint would be highly desirable. With respect to electrical cables generally, a technique has been developed over the years of placing a shell about the joint to be insulated and introducing a liquid material into said shell which subsequently sets to a hard mass having good weather resistance and insulating properties. However, the insulating materials heretofore employed have not had sufficiently high insulating properties in the liquid state to permit the safe passage of electrical energy through the joined conductors while the insulation is applied or is becoming set, thus necessitating delays and interruption of electric service. Furthermore, insulating materials of this type must either be externally heated prior to application to the joint to insure plasticity, or pressure and heat must be applied to the shell containing the liquid to cause the same to set to a hard mass. Also, when the joints of insulated cables of different external diameter are insulated as aforesaid, the shells for containing insulating material have had to have portions of different internal diameters, which of course necessitates a large inventory of shells adapted to accommodate a wide variety of combinations of cable sizes and types of joints. Accordingly, a shell construction which would be adaptable to a wide variety of cable sizes would be desirable, as would an insulating material which might be applied to the electrical joint without delaying or interrupting service.

In accordance with the present invention, there is provided a split mold of plastic insulating material for enclosing a space about the connector or electrical joint, said molds being held together by pressure sensitive material and filled with a self-setting resinous material which has high insulating properties both in the liquid and in the solid state. The end portions of each of said molds are adaptable to a wide variety of cable sizes, thus facilitating application of insulation to a joint between a large cable and one or more of smaller diameters.

In the drawings:

Fig. 1 is a plan view of an insulated and protected joint of the present invention adapted to enclose a branched T-type connector;

Fig. 2 is a verical section on the line 2—2 of Fig. 1;

Fig. 3 is a section on the line 3—3 of Fig. 2;

Fig. 4 is a fragmentary view of the end of one of the shells of Fig. 2, showing details of one type of end construction;

Fig. 5 is a section on the line 5—5 of Fig. 4 illustrating the application of the variable diameter end portion of Fig. 4;

Fig. 6 is a fragmentary section showing another modification of a variable diameter end structure;

Fig. 7 is a vertical section of an insulated and protected joint illustrating a modification of the insulation structure of the present invention;

Fig. 8 is a plan view of the modification of Fig. 7; and

Fig. 9 is a vertical section of a pothead illustrating application of the structures of the present invention.

Referring now to Figs. 1–3, herein there is illustrated a branched T-type joint about which there is placed the insulating and protective structure of the present invention. Insulated main cable 1 carrying conductor 2 comprises the cross of the T and is joined to another insulated cable 3 of smaller diameter carrying conductor 4 by means of a known type of metal branched T connector 6. A sheath of thin rigid non-metallic insulating material consisting of two opposed shells 8 and 9 of complementary arcuate cross section enclose annular spaces 7 about connector 6 and insulated cables 1 and 3 adjacent said connector, and a generally rectangular space 7a between cables 1 and 3. Each of said shells for a substantial distance along the upper edge thereof, i.e., along the top of the cross of the T, are interrupted and recessed as at 10 to provide an opening 11 for introduction of insulating material 12 into the enclosed space 7 about the connector and cables. Each of the shells is flanged along its edges as at 13 thereby providing contacting surfaces for the opposed shells 8 and 9. The contacting surfaces of at least one of said shells is coated with a pressure sensitive bonding or adhesive material so that when the opposed shells are spaced about the cable and connector, as indicated in Figs. 1 to 3, they will adhere to one another providing an integrated sheath about the joint, and also providing a seal between shells which will not permit the passage of liquid insulating material. Alternatively, the contacting surfaces of each shell may be coated with a pressure sensitive cohesive material.

Referring also to Figs. 4 and 5, it will be observed that each of the shells have end portions 16 of variable diameter, and the flanged edges 13 of the shells terminate adjacent these ends 16. In Figs. 4 and 5, the shell is tapered to form the end portions 16. About the tapered end are a series of spaced circumferential grooves 17. By severing the terminal portion or portions of the end 16 from the shell at any one of the grooves 17, the original external diameter of the end 16 is increased. In this manner, the shells are adapted at their ends to embrace a variety of cable sizes. The possibilities of end portions of various different sizes are clearly illustrated in Fig. 5. A smaller cable 3 may be embraced by the terminal edge of the shell while a larger cable may also be embraced by a shell of the same construction simply by removing terminal sections 18 and 19 from the end 16. Such is the case with the construction illustrated in Fig. 2. In another modification of the present invention as at Fig. 6, the spaced circumferential grooves and tapered end of Figs. 4 and 5 are replaced by a stepped end portion. The steps 21 are spaced as necessary to receive the same variety of cable sizes. Terminal steps are removed by filing or otherwise cutting the shell as at 31.

The completed joint of the present invention includes a solid resinous insulating material within the spaces 7. This material should not only be a good insulator in its solid state, but also when liquid. It also should be a self-setting resin, that is to say, one which does not require the application of heat to induce plasticity or setting or require pressure to effect hard setting, one which is mixed with an accelerator to form a liquid mass for introduction to the space within the sheath. Resins which fulfill the requirements include among others epoxy, thiokol, polyester, epoxy-thiokol, epoxy-polyester resins, and mixtures thereof, all of which together with their accelerators are available commercially.

In applying the insulation of the present invention to an already formed cable connection, the cables adjacent the connector are suitably cleaned with a solvent and abrasive material, if necessary. The end portions of complementary shells adapted to the particular shape of the joint to be insulated are cut, if necessary, along the circumferential grooves or steps as the case may be, so that the terminal ends of the shells engage the cables. Opposed shells are then placed about the joint and maintained in position by means of the forementioned cohesive material on the flanged contact surfaces of said shells. In order to perfect the seal between the shell end portions and the cables, a few turns of pressure sensitive tape as at 32 may be applied over such end portions and cable adjacent thereto. With the shells thus in position, powdered resinous material is thoroughly mixed with its accelerator and the resulting liquid introduced into the spaces 7 through hole 11 and the space filled with the plastic, which is then permitted to set to a hard mass, which gives strength, rigidity and high insulating qualities to the joint.

The shells may be formed of a variety of non-metallic materials, with plastics being preferred. Clear cellulose acetate butyrate having a Shore hardness of at least 90 and a minimum wall thickness of about .04" has proved eminently satisfactory. As the shells are relatively inexpensive, the sheath may be left on the joint in the position used, or it may be removed from the cable, since the hardened resin is rigid and weather resistant.

The novel joint insulation of the present invention is adapted to a wide variety of cable joints, involving a plurality of shapes, simply by procuring molded shells of appropriate shape and having the above described variable diameter ends. The insulation may be applied to a cable at its point of termination or connection with apparatus such as transformer. Of course, the simplest joint is the straight through connection such as that illustrated at the top of the T of Fig. 2. In this case, when the cables joined lie parallel to the ground, opposed shells will be recessed along one of their longitudinal edges intermediate the ends. Opposed shells will be so positioned about the horizontal joint opposed recesses and the resulting hole for introduction of insulating material will be at the top. When, however, the conductors joined run generally perpendicular to the ground, opposed shells will be constructed with an open upper end for the introduction of liquid resin.

Figs. 7 and 8 illustrate a modified form of shell for insulating a vertical joint and particularly such as for enclosing a connector 22 electrically joining a grounded metal wrapped cable 23 with a cable 24, which is not grounded. Semi-conically shaped shells 25 and 26 (see Fig. 8), having longitudinal flanged contact surfaces 27 are open at their larger upper ends 28 while having variable diameter end portions 16 at their smaller lower ends for engagement with the insulation 29 of cable 23, which has a grounded metal wrap 30. Each shell has a metal coating 31 covering its exterior surface throughout, such as metal foil, extending beyond the terminus of its variable diameter end as at 33 for electrical contact with cable metal wrap 30. The shape of opposed shells 25 and 26 together with metal coating 31 thereon provides a stress cone which gradually reduces the potential stress on the cable insulation 29 to a suitable low value, such that the grounded metal wrap 30 may be cut off abruptly as at 34 without a sharp change in potential gradient. With the exception of removal of a portion of the metal wrap from the grounded cable, the joint insulation of Figs. 7 and 8 is applied similarly as above described in connection with Figs. 1 and 2. Pressure sensitive tape applied to the variable diameter ends of opposed shells will, of course, be extended to enclose the lower extremity of metal coating 31 and a portion of cable metal wrap 30, as at 32.

The modification of Figs. 7 and 8 is particularly well adapted for use in a pothead. In Fig. 9 there is illustrated a plurality of conductor joints, each insulated in accordance with the present invention. Lead sheathed cable 40 protrudes from the ground and may for example contain three grounded metal wrapped insulated conductors 42, 43, and 44. A protective pipe 45 extends into the ground or, for example, into a foundation structure around cable 40 to a selected depth and a wad of material 46 such as oakum is inserted therein about the cable. Two opposed pothead shells 47 having open upper ends 48 and variable diameter lower end portions 49, as well as flanged contact surfaces 50 are positioned about the upper end of pipe 45, and pressure sensitive tape 51 applied about the variable diameter ends and the adjacent portion of pipe 45. The conductors 42, 43 and 44 are joined to braided insulated cables 42a, 43a and 44a by suitable known forms of metal conductors 22. Opposed smaller shells such as those illustrated in Figs. 7 and 8 are applied as above described about the connectors and adjacent cables. In order to reduce the leakage path existing between cables 42a, 43a and 44a as they extend from the upper open end of shells 47, it is desirable to slide over each conductor a preformed insulator of conventional design. The insulator may be of ceramic material, or may consist of a pair of opposed shells having a plurality of wavy convolutions, common in insulator design, filled with the resin of the present invention. These insulators 52 extend above and below the upper end 48 of opposed shells 47. Following positioning of the insulators, the several smaller shells are filled with epoxy or other resin, after which the outer opposed shells 47 are filled with the resinous substance and the whole permitted to harden. The lower ends of insulators 52 are thus embedded in the resinous material. When employed in pothead construction, the modified shells of Figs. 7 and 8 may be constructed entirely of metal.

Although certain particular embodiments of the invention are herein disclosed for purposes of explanation, various further modifications thereof, after study of this application, will be apparent to those skilled in the art to which the invention pertains. Reference should accordingly be had to the appended claims in determining the scope of the invention.

What is claimed and desired to be secured by Letters Patent is:

1. A permanent insulated joint construction comprising a sheath of two opposed rigid unitary non-metallic generally elongated shells of complementary arcuate configuration in contact with one another along their longitudinal edges, and adapted to enclose a space about a joint in an insulated electrical cable, said shells having at least one end portion of variable decreasing internal diameter adapted to engage said cable and facilitate maintenance of said shells and cable in spaced apart relationship, said end portion being adapted by means of a plurality of spaced surface irregularities for severance of terminal portions thereof, thereby to accommodate cables of varied diameter, each of said shells beyond said edge portion being flanged over substantially the entire length of its longitudinal edges to provide enlarged contact surfaces for the opposed shells, a bonding material on the flange contact surface of at least one shell and a self-curing resin which has high insulating properties both in the liquid and in the solid state filling the space within the sheath, said bonding material on the flange contact surface serving to maintain said shells in opposed relationship and to prevent leakage of fluid self-curing resin from within the sheath formed by said shells.

2. A permanent insulated joint construction comprising a sheath of two opposed rigid shells of complementary arcuate cross-sectional configuration in contact with one another along their longitudinal edges, and adapted to enclose a space about a joint in an insulated electrical cable, each of said shells having an elongated central body portion, the end portions on said body being of variable decreasing internal diameter adapted to embrace said cable and maintain the body portion and the cable in spaced apart relationship, the surface of said end portions being adapted for severance of terminal sections thereof, said body along one edge being shaped to provide an opening to permit introduction of a self-curing insulating medium in liquid form into the space between opposed shells, the body of each of said opposed shells being flanged over substantially the entire length of its longitudinal edges to provide enlarged contact surfaces for the opposed shells, a bonding material on the flange contact surface of at least one shell, thereby to maintain said shells in opposed contacting relationship and to prevent leakage of fluid insulating material from within the sheath formed by said shells, and a self-curing resin which has high insulating properties both in the liquid and in the solid state filling the space within the sheath.

3. In a pothead construction including a sheathed cable carrying a plurality of metal wrapped insulated electrical conductors, a pothead shell, means for sealing the lower end of said shell with respect to said sheathed cable, electrical cables connected to said conductors by means of electrical connectors, the improvement of a permanent insulated joint construction about each of said connectors comprising two opposed rigid unitary non-metallic generally semi-conically shaped shells of complementary arcuate configuration in contact with one another along their longitudinal edges and adapted to enclose a space about the connector, each of said latter shells having an open upper end and a variable diameter smaller lower end adapted to engage one of said conductors to facilitate maintenance of such shells and the connector therein in spaced apart relationship, the surface of said end portions being adapted for severance of terminal sections thereof, each of said latter shells above its lower end being flanged along substantially the entire length of its longitudinal edges to provide enlarged contact surfaces for opposed shells, a bonding material on the flange contact surface of at least one of said latter shells thereby to maintain same in opposed adhered relationship, each of said latter shells having a metallic surface adapted for contact with the metal wrap of said insulated conductors and a self-curing resin which has high insulating properties both in the liquid and in the solid state filling said latter shells and the pothead shell to a level above the open ends of said shells, said bonding material on the flange contact surface also serving to prevent leakage of fluid self-curing resin from within the space enclosed by said latter shells.

References Cited in the file of this patent

UNITED STATES PATENTS

| | | |
|---|---|---|
| 397,221 | Callender | Feb. 5, 1889 |
| 1,238,885 | Chmela | Sept. 4, 1917 |
| 2,065,315 | Keath | Dec. 22, 1936 |
| 2,161,447 | Bishop | June 6, 1939 |
| 2,267,630 | Weiland | Dec. 23, 1941 |
| 2,877,288 | Bollmeier | Mar. 10, 1959 |

FOREIGN PATENTS

| | | |
|---|---|---|
| 243,834 | Great Britain | Dec. 10, 1925 |
| 309,303 | Great Britain | Apr. 11, 1929 |
| 633,847 | Great Britain | Dec. 30, 1949 |

OTHER REFERENCES

Publication I: "What's New in Devices for Cars and Locomotives," published in Railway Age, June 25, 1951 (page 71 relied on).